March 14, 1939.  B. L. MATTHEWS  2,150,559
THERMOSTATIC CONTROL DEVICE
Filed May 29, 1934
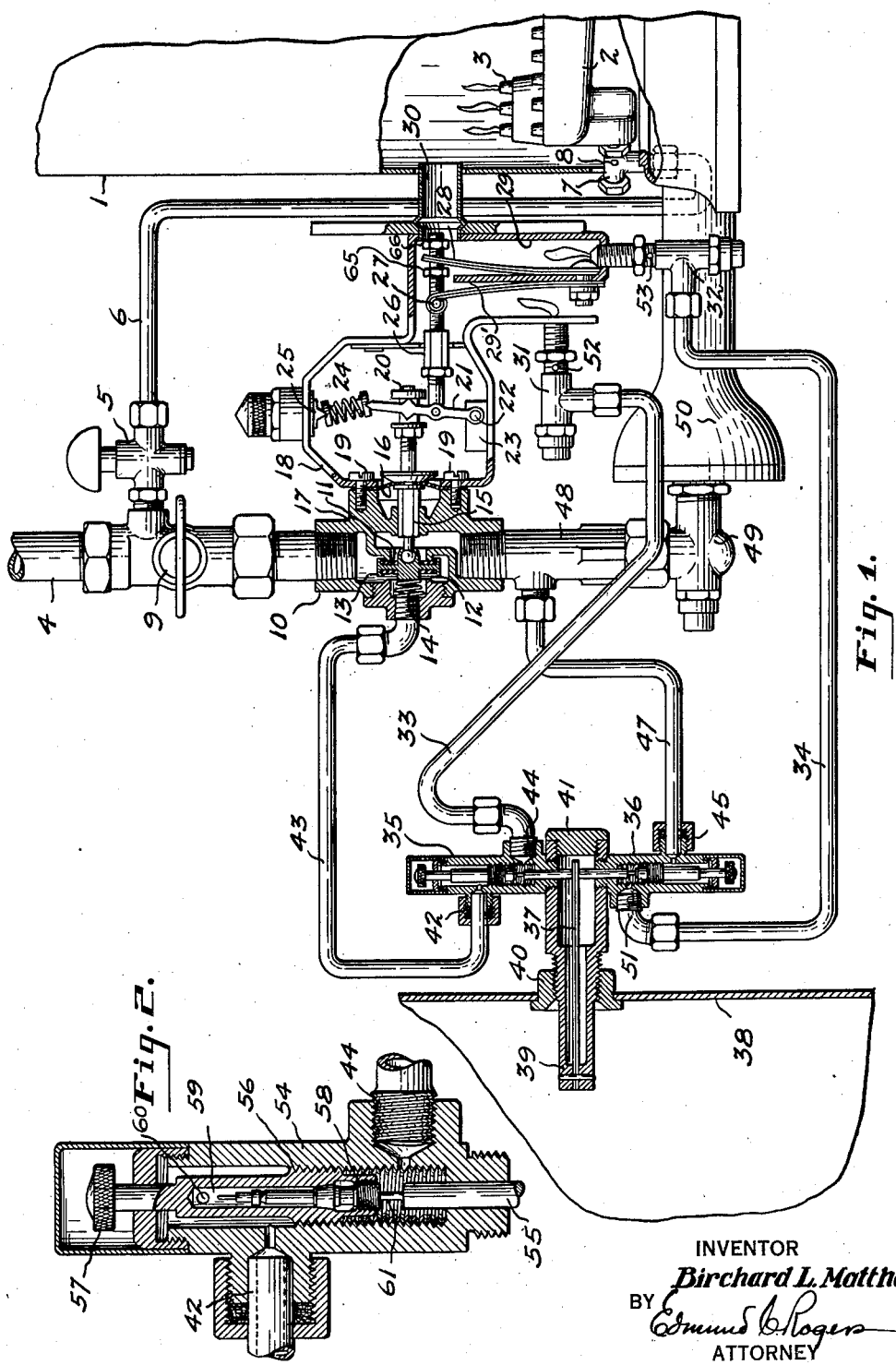
INVENTOR
*Birchard L. Matthews*
BY
*Edmund C. Rogers*
ATTORNEY Patented Mar. 14, 1939

2,150,559

UNITED STATES PATENT OFFICE 2,150,559

THERMOSTATIC CONTROL DEVICE

Birchard L. Matthews, Cleveland, Ohio, assignor to The Patrol Valve Company, Cleveland, Ohio, a corporation of Ohio Application May 29, 1934, Serial No. 728,126

16 Claims. (Cl. 236—21)

This invention relates to control devices wherein a cut-off is operated by heat-responsive members into both the "on" and the "off" positions. More particularly, it has to do with a gas valve controlled by two thermally responsive members, one of which actuates the valve member into "on" position, and the other of which actuates same in the opposite or "off" direction.

On devices of this type heretofore known, the movement of the operation of the device is effected in one direction by the application of heat to a single heat responsive member, while the movement in the opposite direction is effected by withdrawal of the source of heat supply therefrom.

In this improved control, two heat responsive members are provided instead of a single one, one member effecting movement in one direction and the other effecting movement in the other direction. Thus, positive actuation is provided for movement in both directions.

It is, then, an object of this invention to provide a control of the type described in which a cut-off controlling the operation of a thermally actuated burner is effected into both its opening and closing positions by a direct application of heat. Or in other words, a positive heat-responsive return to provide for a thermally actuated cut-off.

A further object is to provide a heat actuated thermal responsive element for cutting off a valve, so that the surrounding heat, as from a main burner, assists in the operation of the valve, instead of retarding it. In other words, this surrounding heat, which is extraneous to the normal medium for actuating the first thermal responsive element connected directly to the valve for actuating the same to open position, affects a second thermal element which is provided to work in opposition to the first thermal element, thus affording means to compensate for the effect of such extraneous heat upon the first thermal element and whereby this extraneous heat assists the closing function of the valve rather than to retard it as would occur without the present novel placement of the second thermal responsive element.

A further object is to provide a control having two thermal elements, one for operating the control to supply fuel to a burner, and the other to cut fuel off from the burner, the cut-off element being more subjected to the heat of the burner than the cut-on member.

A further object is to provide a device wherein a control element for gas valves or the like is provided with bleed lines supplying fuel to operate burners for heating thermally responsive means that operate the main gas valve.

A further object is to provide two such bleed lines, each controlling a burner, and each burner controlling a thermally responsive element, the thermally responsive elements operating in opposition to each other.

A further object is to provide a control element in the bleed lines that closes one line when the other is open.

A further object is to provide a means responsive to the heat produced by the main burner for operating the bleed line control element.

With these and other objects in view, the invention consists in the novel construction, arrangement and combination of parts, hereinafter described, illustrated in some of its embodiments in the accompanying drawing, and particularly pointed out in the appended claims.

In the drawing, Figure 1, is a side elevation, partly in section, of a heating appliance embodying the improved control.

Figure 2 is an enlarged sectional view of the controlling member for the heaters of the heat-responsive members.

The numeral 1 indicates the casing of the heating appliance in which there is a main burner 2 and a continuously operating pilot burner 3 which are supplied with gas from a fuel supply conduit 4, the pilot burner supply being under control of a manually operable control valve 5 that controls the gas supply to the conduit 6 in communication with the burner 3.

A needle adjusting valve 7 is located adjacent the burner 3 for the purpose of further regulating the fuel supply to the burner 3 and for the injection of primary air by way of ports 8 so that this burner operates with a blue flame. The details of the valves 5 and 7 are not shown as these valves may be of any suitable construction and they do not form a part of this invention. The fuel supply line to the main burner 2 is under control of a manually operable valve 9. The valve 9 communicates with the thermally actuated valve 10 which is provided with a pair of valve seats 11 and 12 under control of a valve member 13 which is positioned between these valve seats.

A spring 14 is provided to urge the valve head 13 toward the seat 11. The valve member 13 is carried by a valve stem 15 which is provided with a flexible packing diaphragm 16, the inner portion of which is secured in fluid tight relation around the valve stem, and the outer portion of which is clamped between the valve body 17 and the valve housing 18 by means of the screws 19. The spool 20 is adjustably carried upon the end of the valve stem 15 opposite the end which supports the valve head 13 the adjustment being effected by means of screw threads as shown. The spool 20 cooperates with an oscillating lever 21 which is pivotally mounted at 22 in a block 23 carried by the housing 18. The oscillating lever 21 is in contact at its upper end with a spring 24 which is provided with an adjustable abutment 25 by means of which the tension of the spring may be adjusted.

The elements 21 and 24 provide a snap-action mechanism which is connected to adjustable link 26 under control of a pair of thermostats 27 and 28 here shown as being bi-metallic elements. The thermostats 27 and 28 are positioned in a chimney-like housing 29 which forms a part of the housing 18 and are separated by a baffle wall 29' protecting each element from the other's flame; and also protecting element 27 from heat emanating from main burner 2 through the casing 1 and conduit 30. This portion of the housing communicates with a conduit 30 which extends therefrom to and terminates above the continuously operating pilot burner 3. In the lower portion of the housing 29, there is located a pair of intermittently operating burners 31 and 32 which are connected respectively to fuel supply conduits 33 and 34 under control of the valves 35 and 36. The valves 35 and 36 are actuated by means of a thermostatic strip 37 which may be under control of the medium heated by main burner 2, such as the contents of a tank, 38. Any other suitable control could be used here, provided it produced reciprocal motion in valves 35 and 36.

The thermostatic element 37 is rigidly secured at the inner end of a housing 39 which may be threadably received in a tapped opening 40 of the tank. A closure cap 41 is provided for the outer end of the thermostat housing. The valve 35 is provided with an inlet portion 42 which is in communication with a conduit 43 communicating with the port under control of the valve seat 12 of the thermally actuated valve 10. The outlet passageway 44 of the valve 35 is in communication with the conduit 33 of the burner 31.

The inlet 45 of the valve 36 is in communication with a conduit 47 which is in turn connected to the conduit 48 that is interposed between the thermally actuated valve 10 and an adjusting valve 49 which is arranged to inject gas into the gas and air mixing tube 50 of the burner 2. The valve 49 is of suitable conventional design and is not herein illustrated in detail.

The outlet opening 51 of the valve 36 is in communication with the conduit 34 which is provided for the supply of fuel to the burner 32. The burners 31 and 32 are provided with needle adjustment valves and are also provided with primary air ports 52 and 53 respectively so that the flame supported by these burners is substantially blue flame in character.

The valves 35 and 36 are identical in design and by referring to the enlarged view, Figure 2, it is to be seen that they are formed from a valve body portion 54 having inlet and outlet openings 42 and 44. A valve tappet 55 is provided for effecting the operation of the valve member, which in the present case, consists of a longitudinally adjustable element 56 adjustably carried by the valve body 54.

A head is provided on this member 56 to effect its adjustment. This member 56 is provided with an axial bore 59 with inlet openings 60 through which gas is supplied to the bore 59. The flow of gas between inlet 42 and outlet 44 is under control of the valve member 58. This valve member is the familiar type of pneumatic tire valve, opened by depressing a stem as at 61.

Thermostatic bar 28 is connected to link 26 by a lost motion connection including two adjustable nuts 65 and 66, threaded into the link. Thus when link 26 is shifted to the left under action of thermostat 27, with thermostat 28 cool, nut 66 is moved into contact with thermostat 28. Then upon heating of thermostat 28, its motion to the right is immediately communicated to link 26. With 28 in its extreme right position, when burner 32 is cut-off, the cooling of bar 28 does not force link 26 to the left, because of the lost motion provided by nut 65.

In the operation of the device, the pilot burner 3 is first ignited and the height of its flame regulated by means of the valves 5 and 7. The main burner shut-off valve 9 is next opened thereby admitting gas to the thermally operated valve 10. With the valve in the position shown, when the valve 9 is opened, gas will pass by way of the uncovered valve seat 12 to the conduit 43 and will then be under control of the valve 35 which is in turn controlled by the temperature of the contents of the tank 38. In the event the temperature of the contents of the tank 38 is below a predetermined point, the thermostat 37 will be raised a sufficient distance to open the valve by pressure on stem 61, thereby supplying gas through outlet 44 and conduit 33 to the intermittently operating burner 31. Gas from this burner escapes by way of the conduit 30 and is ignited from the pilot burner 3 flashing back through the conduit 30 to ignite burner 31. After a few moments of the operation of the burner 31, the thermostatic strip 27 will be sufficiently heated to cause the upper end of the thermostat 27 to move to the left as viewed in Figure 1, thereby carrying with it the adjustable link 26 and the associated snap-action mechanism. Upon passing its dead center position the snap-action mechanism snaps to the left carrying with it the valve stem 15 and the valve head 13. This movement uncovers the valve seat 11 supplying gas to the burner 2 and at the same time covers the valve 12 cutting off the supply of gas to the burner 52. This permits the thermostatic element 27 to cool and move to the right; and shortly thereafter, by reason of the spring 14 the valve head 13 follows the movement of the strip 27 again closing valve 11, and opening valve 12.

Gas is again admitted to the burner 31, through valve 12, and ignited from the pilot 3 again to open valve 11. The valve will then assume a position open just enough to supply sufficient heat to the burner 31 to keep the valve in that stated position. In other words it is graduated to a position in between valve seats 11 and 12, permitting gas to flow both through conduit 43 to support burner 31, and to conduit 48 to support main burner 2. As soon as gas is supplied to main burner 2, it will ignite from pilot burner 3.

After the main burner 2 has been in operation for a sufficient length of time to heat the contents of the storage tank 38, the free end of the thermostat 37 will shift downwardly as viewed in Figure 1, causing the valve 35 to close and at the same time opening valve 36. Upon this operation's taking place, the supply of gas to the burner 31 is cut off and gas is then supplied to the burner 32 which is ignited from the pilot 3 through conduit 30, whereupon the thermostat 27 commences to cool and the thermostatic strip 28 is rapidly heated. Heating of the strip 28 causes the free end to move to the right as viewed in Figure 1, while cooling of the strip 37 causes it to shift in the same direction as the strip 28; viz. to the right. This causes these two thermostats to shift the adjustable link and its associated parts to the right thereby effecting the closure of the main thermally actuated valve 10. When this takes place, the gas supply to the burner 2 and to valve 36 is cut off. The thermostat 37 remains in the downward position so long as the tank contents remain heated, and hence valve 36 remains open. However, the gas supply to this valve is cut off by closure of valve 12, so that no fuel flows to burner 32. As soon as the tank contents call for heat, thermostat 37 is raised, closing valve 36 and opening valve 35, initiating the cycle of operation anew.

It is to be observed that with this design, heat from the main burner tends to assist cutting off valve 10, because of its effect on thermostat 28. In the devices heretofore known, heat from the main burner acted to retard cutting off the valve, with the possibility of great danger. This has been explained in the foregoing outline of the objects of the invention and should be readily understood from the above description. From an inspection of the drawing it will be seen that the two thermal responsive elements 27 and 28 are so positioned relatively to each other and to the heated chamber 1, and that any heat, as from this chamber, which is extraneous to the burner 52, affecting the thermal element 27 will also affect the second thermal element 28. As stated this heat from the main burner, because it affects both thermal elements, will assist rather than retard the cutting off of the valve.

It is to be particularly noted that the present invention is especially adaptable to thermostatic controls when used, as is shown in Fig. 1 of the drawing, in close proximity to a heated chamber, i. e., thermostatic devices that depend upon the functioning of the thermal element by heat in addition to that of the heated chamber. In this class of device as stated above it has been found that the heat which radiates from the heated chamber ofttimes affects the operation of the thermal element especially when the latter's own heating medium has been turned off. When these detrimental conditions are present it is found that the thermostatic actuator is very materially retarded in its operation, and in many instances to fail almost entirely if the heat as in the chamber 1 illustrated in the drawing is of a high degree.

As described the thermal element 27 which constitutes the primary actuator for the valve 13 is supplemented by means of a second thermal element 28. The structure of elements 27 and 28 is such that when affected by heat they move in opposite directions. Fig. 1 clearly illustrates the condition of the thermostatic control device when in inoperative or cold position, with the valve 13 closing off the gas supply to the main burner and with the upper end of thermostat element 28 completely out of operating contact with the link 26. In bringing about the ignition of the main burner 2, heat is supplied by means of the burner 52 to the thermal element 27 which moves to the left of Fig. 1 to uncover valve seat 11. Thereupon the element 27, link 26 and adjustable nuts 65 and 66 thereon have been moved to the left and in this position the nut 66 engages the second thermal element 28. This condition prevails as long as heat is supplied to the thermal element 27. When it is desired to close off the supply of gas to the main burner 2 the burner 52 or other medium for supplying heat to the primary thermal element 27 is cut off and this element may then upon cooling retract to its original position and thus move the valve 13 to cover the seat 11. If however there is sufficient heat in the casing surrounding the thermal element which has come from the heater chamber 1, then the cooling of the thermal element 27 is materially retarded. To offset this latter detrimental condition, thermal element 28 has been provided and as explained above the latter when heated tends to move the link 26 to the right of Fig. 1. Thus the same extraneous heat that affects thermal element 27 to cause the retardation of its normal movement in closing the valve will also affect the thermal element 28 and in this manner element 28 operates to overcome the retardation of movement of element 27 and permit the latter to operate in substantially normal manner. Obviously, by reason of the adjustability in the connection between element 28 and the link 26, the above stated compensating function of element 28 may be varied to suit individual installation or placement of the thermostatic actuating device.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

It is to be understood that the system is appliable to other than gas valves, and that where the form "valve" is used it is intended to apply generically to cut-offs, such as electric switches, etc.

Having thus described my invention, what I claim is:

1. In a device of the kind described, a cut-off, thermal means for operating the cut-off in one direction, thermal means to operate it in another direction, fuel operated heat means for each thermal means, and a single means for selectively admitting fuel to either of said heat means.

2. In a device of the kind described, a cut-off, a thermally responsive means actuating said cut-off in one direction, a second thermally responsive means actuating said cut-off in another direction, and means for adjusting the point at which said actuation occurs, and a single means for selectively causing either one of said thermally responsive means to operate.

3. In combination, a fuel line, a main heater connected thereto, a cut-off in said line, thermally responsive means controlling said cut-off, said means including two thermally responsive elements and two associated heating elements, and means connecting each of said heating elements to the fuel line, said thermally responsive element being oppositely operable under the heat of their associated heating elements to positively move said cut-off in opposite directions.

4. A device as claimed in claim 3, in which one of said heating elements is supplied with fuel from ahead of the cut-off, and the other is supplied with fuel from behind said cut-off.

5. A device of the kind described, including a burner, a fuel supply for said burner, a cut-off for said fuel supply, thermally responsive means controlling said cut-off, said means including two thermally responsive elements, and a heating means for said element, one element for actuating the cut-off into the "on" position in response to being heated, and the other for actuating it into the "off" position in a response to being heated, and a third thermal element for controlling said heating means.

6. In a device of the kind described two heating means, an individual fuel line to each heating means, a cut-off for said fuel lines and a single thermally responsive means actuating said cut-off to open either one or the other of said fuel lines.

7. In a device of the kind described, a main heater, two oppositely working thermally responsive elements, a member actuated thereby, a means for actuating each element, and means operable in response to heat produced by said heater for selectively causing either actuating means to be operative and the other to be simultaneously inoperative.

8. In a device of the kind described, a fuel line, a main heater energized therefrom, a pair of bleed lines leading from the fuel line, a pair of heating elements operated from said bleed lines, and a single means operated by said main heater for controlling both bleed lines, said last means operating to open either one or the other of said bleed lines and to simultaneously close the other.

9. A device including a main fuel line, a main fuel consumer in said line, a plurality of bleed lines leading from said fuel line and separate from said main consumer, a heating member in each bleed line, and means responsive to the heat of each heating member for cutting off the fuel to its bleed line.

10. In a device of the kind described, a fuel line, a main fuel consumer therein, a plurality of bleed lines leading from said fuel line and separate from said consumer, a cut-off for said bleed lines, a heater element in each bleed line, and means responsive to the heat of one of said heater elements for operating the cut-off to open another of said bleed lines.

11. A safety control including a main heating element, a pilot igniter therefor, means dependent upon the operativeness of the pilot and operating in one direction to admit fuel to the main heating element, and a second means, heat responsive, for operating the fuel admitting means in the other direction, and a second heat supply means independent of said main heating element for said second means.

12. In a device of the kind described, a main heater, a fuel line therefor, a cut-off in said line, heat responsive means for operating the cut-off into the "on" position, heat responsive means for operating the same into the "off" position, and heating means separate from the main heater for actuating both said heat responsive means.

13. In a device of the kind described, a heater, a fuel supply for said heater, a cut-off in said fuel supply, two auxiliary heating means, means conveying fuel from in front of the cut-off to one of said auxiliary heating means, means conveying fuel from behind the cut-off to the other of said auxiliary heating means and thermal devices actuated by said auxiliary heating means to operate the cut-off.

14. In combination, a valve, a thermally responsive element for actuating the same in one direction, a burner for supplying heat to actuate said thermally responsive element, a fuel supply line to said burner and connections including said valve in said line, said connections comprising means varying the supply of fuel to said burner with gradual action and depending upon the actuation of said thermally responsive element, a second thermally responsive element connected to said valve and operating in opposition to said first thermally responsive element, said second thermally responsive element being actuated by heat means other than the means for heating said first thermally responsive element.

15. In combination, a heat chamber having a main burner therein, a fuel supply line to said burner, and a thermostatic control device comprising an assembled unit of construction mounted exteriorly of said chamber, said device including a valve connected in said fuel line to control the supply to said main burner, actuating means for said valve, thermally responsive means connected to said actuating means, said thermally responsive means operating under heat to move the valve in one direction, a second thermally responsive means connected to said actuating means and operating under heat in opposition to said first thermally responsive means, both said thermally responsive means being arranged in proximity to each other so that any heat extraneous to the heat for operating said first thermally responsive means causes said second thermally responsive means effectively to compensate for the effect of such extraneous heat upon said first thermally responsive means.

16. A thermostatic control device comprising a casing, a valve therein, an actuating member for said valve, a thermally responsive member in said casing connected to said actuating member and operating under heat to move the valve in one direction, a second thermally responsive member in said casing and operating under heat to move in the opposite direction to said first thermally responsive member, and adjustable connections between said second thermally responsive member and said actuating member, said connections being constructed to permit the normal operation of said first thermally responsive member when said latter is alone subjected to heat.

BIRCHARD L. MATTHEWS.